Nov. 14, 1967     A. R. McCLOSKEY     3,351,999

MANUFACTURE OF SELF-ALIGNED BEARINGS

Original Filed July 22, 1960     2 Sheets-Sheet 1

INVENTOR.
ALBERT R. McCLOSKEY
BY
Davis, Hoxie, Faithfull + Hapgood
ATTORNEYS

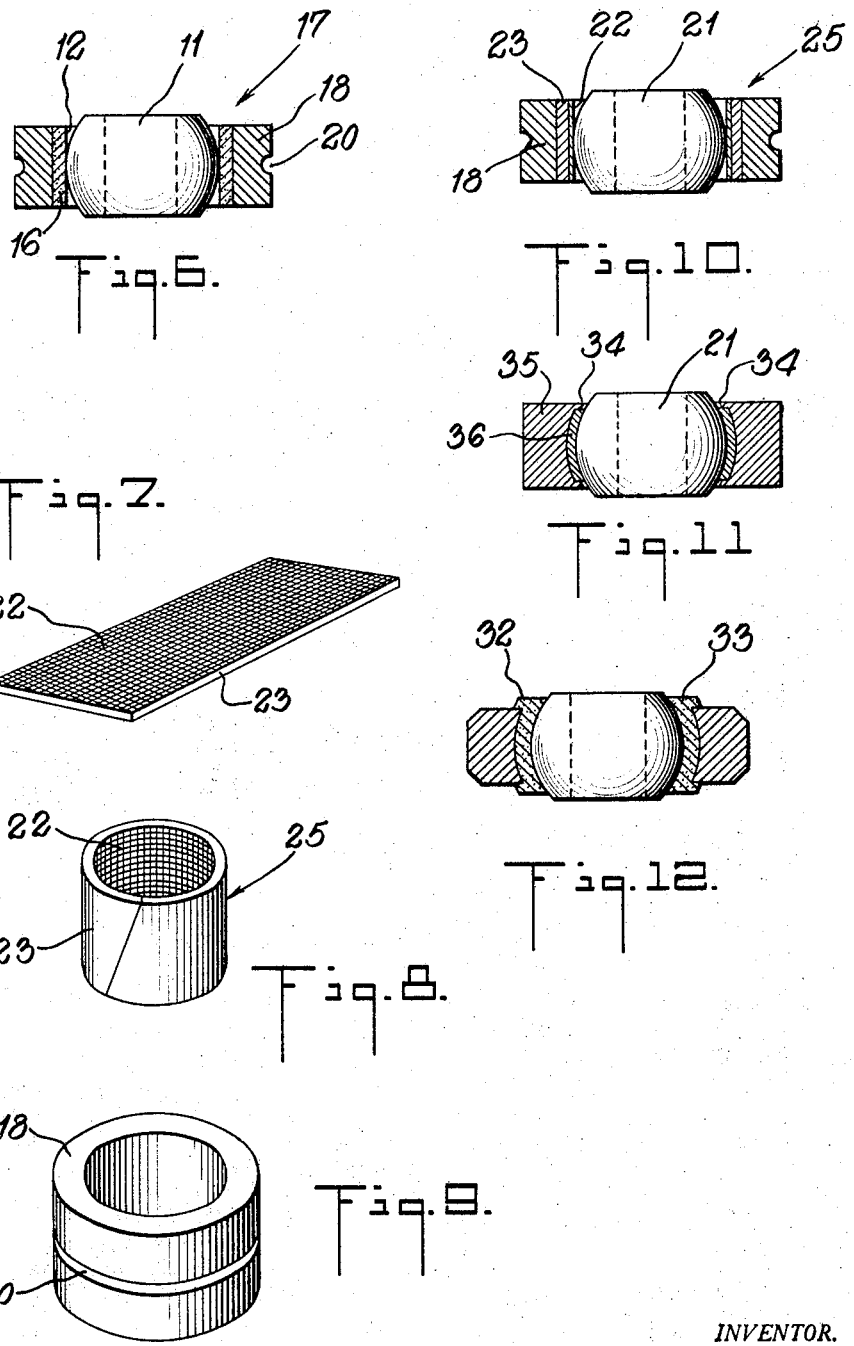

United States Patent Office 3,351,999
Patented Nov. 14, 1967

3,351,999
MANUFACTURE OF SELF-ALIGNED BEARINGS
Albert R. McCloskey, Fairfield, Conn., assignor by mesne assignments, to The Heim Universal Corporation, a corporation of Delaware
Continuation of abandoned application Ser. No. 44,763, July 22, 1960. This application Nov. 4, 1965, Ser. No. 518,499
3 Claims. (Cl. 29—149.5)

The present invention relates to a method of making a self-aligning bearing having an inner member with a convex outer surface and an outer member with a concave inner surface, the outer member being deformed so that it fits closely around the inner member. This application is a continuation case based upon the applicant's patent application Ser. No. 44,763, filed July 22, 1960, now abandoned.

The versatility of bearings of this type has long been recognized and manufacturers of them have been called upon for many years to furnish them for a wide variety of uses. Their versatility has been limited, however, because bearing manufacturers producing current forms of bearings and using current methods of producing them have been unable to provide for effective, long-lasting lubrication of bearings which are not readily accessible.

Materials with special lubricating characteristics, such as sintered metals like sintered iron, and plastic lubricants like Teflon, have been suggested as possible solutions to the problem, but so far they have proved either not rigid enough or not strong enough to withstand the stresses of the operation of deforming the outer member or of later use.

According to my invention, I provide an additional member of sufficient rigidity and strength to withstand stresses of the deformation operation and later use, between the inner and outer members. This intermediate member is made by forming a rigid tube and placing the tube between the inner and outer members prior to the deformation of the outer member. If the material with special lubricating characteristics desired for a particular use is itself sufficiently rigid and strong to withstand the rigors of that use and of the deformation operation, the intermediate member is made entirely of that material. If that material is not sufficiently rigid and strong, it is arranged so that it is carried by an intermediate member of other material which is sufficiently rigid and strong, as, for example, by bonding it to the more rigid and strong material. Both the intermediate member and the outer member are then deformed to surround the inner member.

My invention is illustrated by the embodiments described below and shown in the accompanying drawings, of which:

FIG. 6 shows the assembly of the parts shown in FIGS. 4 and 5, together with the inner member prior to the forming operation;

FIG. 7 illustrates the form of intermediate member used in the bearing of FIG. 2, prior to the forming of the intermediate member;

FIG. 8 illustrates the form of the material of FIG. 7 after it has passed through a forming operation;

FIG. 9 illustrates an outer member used in conjunction with the part in FIG. 8;

FIG. 10 illustrates the relative position of the parts of FIGS. 8 and 9 and the inner member prior to the forming process;

FIG. 11 is a cross-sectional view of a type having retaining lips on the outer member; and FIG. 12 is a cross-sectional view of a type having retaining lips on its intermediate member.

Figure 1:
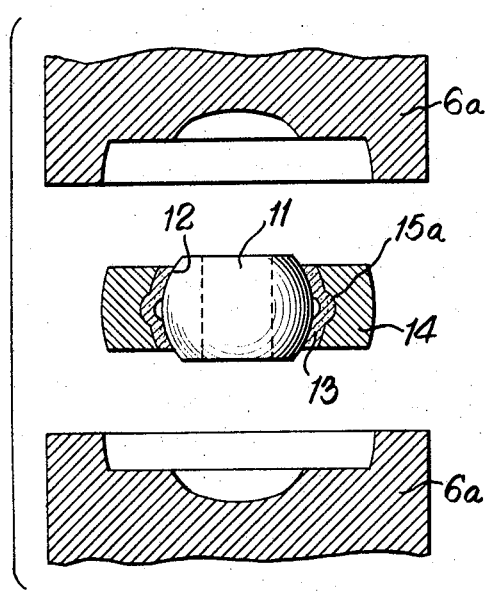
FIG. 1 is a schematic cross-sectional view of a type wherein an intermediate member of porous metal is interlocked with the inner surface of a conventional outer member.

The form shown in FIG. 1 has a ball member 11 with an intermediate member 13 and an outer member 14. The member 13 is of porous metal and the outer member is of any ductile metal. Plastic lubricant 12 is impregnated into the surface of the member 13. This could just as well be liquid lubricant in circumstances in which liquid is preferable. Solid lubricants which can be impregnated include graphite and molybdenum disulphite. The porous intermediate member and the outer member 14 are interlocked against rotation and separation by being distorted at 15a. The distortion is introduced in the forming process as described below.

Figure 2:
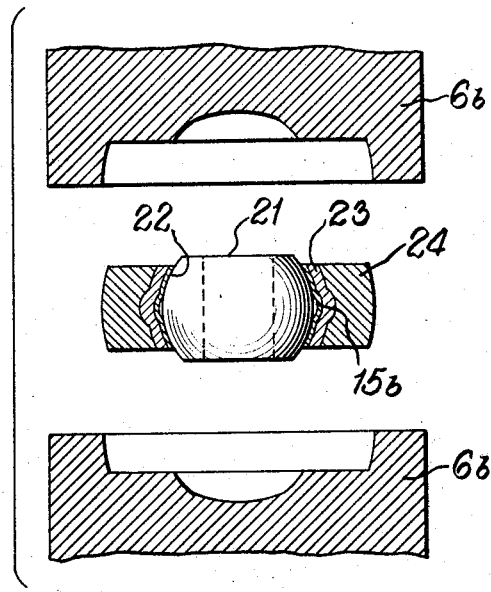
FIG. 2 is a schematic cross-sectional view of a type of bearing wherein a plastic lubricant is bonded to the inner surface of an intermediate member which is interlocked with the inner surface of a conventional outer member.
Figure 3:
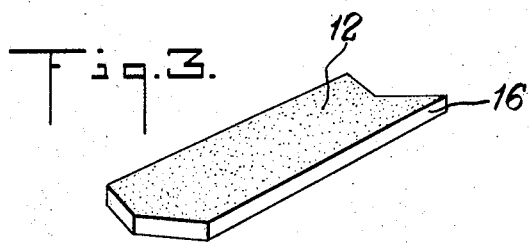
FIG. 3 shows the form of a strip of porous metal impregnated with plastic lubricant prior to forming as used in the embodiment of FIG. 2.
Figure 4:
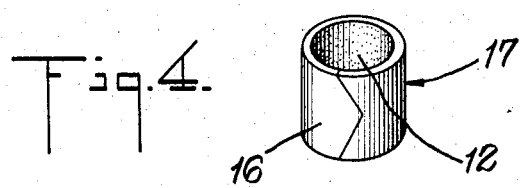
FIG. 4 shows the form of the strip of FIG. 3 after it has passed through a forming operation.
Figure 5:
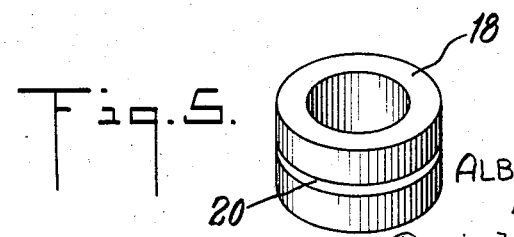
FIG. 5 shows an outer member used in conjunction with the part in FIG. 4.

The form shown in FIG. 2 has a plastic lubricant 22, such as woven fabric of Teflon, bonded to an intermediate member 23 by cement. It also has an outer member 24, of ductile steel. The intermediate member 23 and the outer member 24 are distorted during fabrication as in the case of the form shown in FIG. 2.

The method of fabricating the form shown in FIG. 1 is illustrated in FIGS. 3 through 6. In this form, a strip of porous metal 16 is impregnated with plastic lubricant 12, and then formed into a cylinder 17. Strip 16, and similarly strip 23, have edges which abut, when formed into a tube, along a line other than a circumference of the tube perpendicular to its axis. Such edges avoid ball member 11 pressing against the edges along a single line when stress is applied to member 11 perpendicular to its axis. The cylinder 17 is assembled inside an outer member of ductile material 18, and the inner spherical member 11 is inserted. Dies 6a, having a configuration generally as shown in FIG. 1, are then brought together to swage the intermediate and outer members around the inner member 11. The action of the dies 6a also introduces distortion at 15a as a result of the annular groove 20 about the equatorial portion of the outer surface of the member 18 which is cut into the member prior to the assembly operation. The groove causes a weakening of the member during the forming operation and results in a buckling of the material in that area. This buckling also causes the area of contact between the inner and outer members to be reduced, thereby reducing the friction between them.

The process used in fabricating the form of FIG. 2 is shown in FIGS. 7 through 10. Teflon woven cloth 22 is bonded to a thin metal strip 23, of ductile metal, which is then formed into an intermediate member 25 and assembled within an outer member 18, of ductile steel. The ball 21 is placed within the intermediate member 23 and the combination is then deformed by dies 6b as shown in FIG. 2. Interlocking distortion is introduced at 15b to prevent disassociation of the intermediate member and the outer member, this distortion being a result of a groove 20 in the outer member 18, as described in the case of the form of FIG. 1.

An alternative method of interlocking the intermediate and inner members is shown in FIG. 11, in which inner member 21 is held by the extended lip portion 34 of outer member 35. The outer member 35 is deformed over the top and bottom edges of intermediate member 36 so as to retain it in the bearing.

Another alternative method of forming the outer member to achieve the interlocking relationship between the intermediate member and the outer member is illustrated in FIG. 12, where it may be seen that retaining lips 32 are formed on the intermediate member 33 during the deforming operation by using an intermediate member of slightly greater vertical dimension than the vertical dimension of the outer member. In this case, the excess material of the intermediate member will mushroom during the deforming operation and flow over the inner edges of the outer member.

It should be noted that each of the three members which together comprise the product according to my invention is positively locked within the combination by the swaging step. In the absence of further distortion, nothing can fall out.

It should also be noted that, although it is desirable for some purposes to lock the outer and intermediate members together positively, as in FIGS. 1, 2, 11 and 12, in order that they will not be locked within the combination but also be prevented from rotating relative to each other, it is possible to prevent this relative rotation without positive locking, that is, by friction locking alone. In the case of friction locking, it is necessary to ensure that the friction between intermediate member and outer member is greater than the friction between intermediate member and inner member.

It should be understood that when outer and intermediate members are interlocked by friction alone, the prevention of relative rotation is not as certain as it is in the case of positive interlocking. In all cases, however, regardless of the method of interlocking intermediate and outer members, the locking of the three members within the combination is achieved, so that nothing can fall out.

I claim:

1. The method of manufacturing self-aligning bearings of the type having an inner member with a convex outer surface and an outer member and an intermediate member each having a concave inner surface, said intermediate member being formed from a ductile tube, comprising cutting an annular groove in the outer surface of said outer member between its ends, assembling the members, and applying deforming pressure to the outer member to cause a buckling of the material in the intermediate and outer members in the area of said groove thereby interlocking said intermediate member and said outer member and to also cause the outer member to fit closely around the intermediate member and the intermediate member to fit closely around the inner member.

2. The method of manufacturing self-aligning bearings of the type having an inner member with a convex outer surface and an outer member and an intermediate member each having a concave inner surface, said intermediate member being formed from a ductile tube, comprising
   (1) bonding a woven cloth of self-lubricating plastic material to a thin ductile metal sheet,
   (2) forming said bonded woven cloth of self-lubricating plastic material and thin ductile metal sheet into a desired bearing liner shape,
   (3) assembling the members, and
   (4) applying deforming pressure to the outer member to simultaneously cause the outer member to fit closely around the intermediate member and the intermediate member to fit closely around the inner member.

3. The method as described in claim 2, wherein the outer member is subjected to a preliminary operation of cutting an annular groove in its outer surface between its ends.

References Cited
UNITED STATES PATENTS

| | | | |
|---|---|---|---|
| 1,715,268 | 5/1929 | Ayers | 29—149.5 X |
| 2,738,570 | 3/1956 | Heim | 29—149.5 |
| 2,804,679 | 9/1957 | Tracy | 29—149.5 |
| 2,898,671 | 8/1959 | Heim | 29—149.5 |
| 2,904,874 | 9/1959 | Norton | 29—149.5 |
| 2,923,580 | 2/1960 | Dwyer | 29—149.5 |
| 2,952,901 | 9/1960 | King | 29—149.5 |
| 2,958,927 | 11/1960 | Kravats | 29—149.5 |
| 3,068,552 | 12/1962 | Williams et al. | 29—149.5 |
| 3,085,312 | 4/1963 | Evans | 29—149.5 |
| 3,131,978 | 5/1964 | White | 308—238 |
| 3,217,388 | 11/1965 | White | 29—441 X |

CHARLIE T. MOON, *Primary Examiner.*

THOMAS H. EAGER, FRANK SUSKA, *Examiners.*